US012695347B2

(12) United States Patent
Rudolph et al.

(10) Patent No.: US 12,695,347 B2
(45) Date of Patent: Jul. 28, 2026

(54) DYNAMOELECTRIC MACHINE AS A DRIVE OF AN ELECTRICALLY DRIVEN VEHICLE

(71) Applicant: Meritor Electric Vehicles Germany GmbH, Nuremberg (DE)

(72) Inventors: Felix Rudolph, Nuremberg (DE); Jonas Lang, Postbauer-Heng (DE)

(73) Assignee: Meritor Electric Vehicles Germany GmbH, Nuremberg (DE)

( * ) Notice: Subject to any disclaimer, the term of this patent is extended or adjusted under 35 U.S.C. 154(b) by 216 days.

(21) Appl. No.: 18/686,187

(22) PCT Filed: Aug. 4, 2022

(86) PCT No.: PCT/EP2022/071966
§ 371 (c)(1),
(2) Date: Feb. 23, 2024

(87) PCT Pub. No.: WO2023/025564
PCT Pub. Date: Mar. 2, 2023

(65) Prior Publication Data
US 2024/0380267 A1 Nov. 14, 2024

(30) Foreign Application Priority Data
Aug. 24, 2021 (EP) ...................................... 21192750

(51) Int. Cl.
*H02K 3/12* (2006.01)
*H02K 1/16* (2006.01)
(Continued)

(52) U.S. Cl.
CPC ................. *H02K 3/12* (2013.01); *H02K 1/16* (2013.01); *H02K 5/04* (2013.01); *B60K 1/02* (2013.01); *B60K 11/00* (2013.01)

(58) Field of Classification Search
CPC .. H02K 3/12; H02K 1/16; H02K 5/04; H02K 9/12; H02K 9/19
(Continued)

(56) References Cited

U.S. PATENT DOCUMENTS

2010/0033039 A1* 2/2010 Sakai ...................... H02K 5/203
310/54
2017/0317547 A1* 11/2017 Bolz ......................... H02K 3/28
(Continued)

FOREIGN PATENT DOCUMENTS

EP 1193829 A2 * 4/2002 ............... H02K 3/04
JP 2014064361 A 4/2014
(Continued)

OTHER PUBLICATIONS

Machine English Translation JP2016185034 (Year: 2016).*
International Search Report dated Oct. 6, 2022 for related PCT Appln. No. PCT/EP2022/071966; 8 Pages.

*Primary Examiner* — Jose A Gonzalez Quinones
(74) *Attorney, Agent, or Firm* — Brooks Kushman P.C.

(57) ABSTRACT
An electrically driven single-axle or multiple-axle bus or truck having at least one dynamoelectric machine. At least one axle can be driven by at least one dynamoelectric machine. The dynamoelectric machine has a stator located in a housing and has a winding system arranged in slots situated in the region of an air gap. The winding system is of polyphase design and forms end windings at the end sides of the stator. Conductors of the electrical phases are arranged axially directly on the end winding. A conductor of a star-point of the polyphase winding system is provided radially over the end windings between the end winding and the housing. The end windings are each provided with a winding cap. The winding cap guides electrical conductors of the winding system and/or phase lines and/or star-point lines.

10 Claims, 4 Drawing Sheets

(51) Int. Cl.
    *H02K 5/04*          (2006.01)
    *H02K 9/12*          (2006.01)
    *H02K 9/19*          (2006.01)
    *B60K 1/02*          (2006.01)
    *B60K 11/00*        (2006.01)

(58) Field of Classification Search
    USPC ........................... 310/49.13, 52, 64, 195, 54
    See application file for complete search history.

(56)              References Cited

U.S. PATENT DOCUMENTS

2019/0149003 A1    5/2019   Ishikawa et al.
2019/0334409 A1   10/2019   Dib et al.

FOREIGN PATENT DOCUMENTS

JP         2016185034 A  *  10/2016
WO    WO-2012175476 A2  *  12/2012  ............. H02K 3/325

* cited by examiner

DYNAMOELECTRIC MACHINE AS A DRIVE OF AN ELECTRICALLY DRIVEN VEHICLE

CROSS-REFERENCE TO RELATED APPLICATIONS

This application is the U.S. national phase of PCT Application No. PCT/EP2022/071966, filed Aug. 4, 2022, which claims priority to European Patent Application No. 21192750.4, filed Aug. 24, 2021, the disclosures of which are incorporated in their entirety by reference herein.

The invention relates to a drive of an electrically driven vehicle, in particular a truck or bus, and to the electric vehicle itself.

As a result of an electromagnetic interaction between an energized winding system of a stator and a rotor, dynamo-electric machines generate a torque, which may be used, amongst other things, to drive an electric vehicle.

The polyphase winding system has phase elements, which each comprise coil arrangements which, at an end face of the stator, form an end winding to which circuit arrangements of the winding system are attached. This position of the circuit arrangement additionally contributes to the axial length of the stator, which may lead to corresponding modifications and limitations of the vehicle design, particularly in the case of electrically driven vehicles.

Owing to the spatial proximity of different voltage potentials, this positioning of the circuit arrangements of the winding system in the axial elongation of the end winding leads to comparatively complex insulation measures to achieve the desired electric strength of the winding arrangement as a whole, which in turn increases the necessary installation space.

As insulating elements between coil conductors and a grounded laminated core, JP 2010-263675 discloses caps as insulating elements of a winding system.

Furthermore, US 2013-0193800 A1 discloses caps for a tooth-wound coil, which overlap axially in the slot region of these tooth-wound coils.

Starting with this, the invention is based on the object of creating a dynamo-electric machine, which is suitable as a drive of an electrically driven vehicle and is configured in a spatially optimized manner. In addition to automobiles, electrically driven vehicles should be understood to include vehicles with a payload, for example trucks or buses.

The solution to the said object is achieved by a dynamo-electric machine as a component of a drive of an electrically driven truck or bus, wherein the dynamo-electric machine has a stator, which is located in a housing and has a winding system arranged in slots located in the region of an air gap, wherein the winding system is of polyphase design and forms end windings at the end faces of the stator, wherein the conductors of the electrical phases are arranged axially directly on the end winding and wherein a conductor of a star point of this polyphase winding system is provided radially above the end windings—between the end winding and the housing.

The winding system is composed of coils, wherein coils are understood to be a number of supply and return conductors which surround one tooth or multiple teeth of the stator. In other words, these are chorded coils, which have a coil width of several slot pitches, or tooth-wound coils which each surround only one tooth. Each coil has a plurality of windings, irrespective of whether it is a chorded coil or tooth-wound coil. Each coil has a coil input and a coil output. The coil input is supplied via the respective power supply—for example via the phase L1, L2 or L3 in the case of a polyphase winding system—whereas the coil output is electrically conductively connected to a star point.

The star point therefore comprises all coil outputs of the winding system of the dynamo-electric machine.

There is therefore one star point for each winding system of a motor, which star point is arranged around the end face of the stator in a circumferentially extending manner.

Alternatively, the star point may also be designed as multiple separate star points. In this case, for example, three adjacent coil outputs of different electrical phases are united in one star point. As seen in the circumferential direction, multiple mutually separate star points are present. This enables greater compactness in the design of a motor of a truck or electrically driven bus.

To also meet the insulation requirements imposed, in particular, on a compact design of a dynamo-electric machine in commercial vehicles, such as electrically driven trucks or buses, the phase wires are circumferentially guided in the axial elongation of an end winding of the winding system, whilst the star point is circumferentially, or partially circumferentially, guided and secured radially above the end winding—between the end winding and the housing.

This results in a more compact design of the dynamo-electric machine since, in particular, the star point, which is guided at least partially in the circumferential direction, no longer has to be insulated accordingly with respect to the phase wires.

The installation of the star point or the star-point conductor and the insulation requirements imposed on the system as a whole are preferably further improved according to the invention in that the end windings have winding caps which, amongst other things, assume the guidance of the phase conductors and the star point. Furthermore, the insulation requirements between the phase conductors and the coils of different phases, as well as between the phase conductors and the star point, are also satisfied.

The winding cap has the further means for guiding electrical conductors of the winding system and/or phase wires and/or star-point wires. These are, inter alia, guide slots, recesses and/or boundaries, which facilitate and improve the clamping and positioning of the respective conductors so that a compact design may be ensured.

Since a compact design of a dynamo-electric machine may result in corresponding thermal loads, the housing has radially outer cooling ribs or cooling tubes embedded in the housing so that either air or water cooling may be realized.

The water cooling is preferably a cooling jacket, whereof the cooling tubes are helically guided in the circumferential direction or are distributed over the circumference of the housing in a meanderingly extending manner.

Such a compactly designed dynamo-electric machine is suitable, in particular, for installation in electrically driven vehicles, such as automobiles, electrically driven trucks or electric buses. The aim is to maximize the space available for corresponding loading or a desired number of people, most notably in the case of trucks and electric buses, and this is achieved, amongst other things, if the drive components are designed to be as small as possible, i.e. they take up the smallest possible volume within the vehicle.

Each axle of the vehicle can be driven by one or two motors here.

Two motors on a drive axle may also be electrically coupled so that an electric axle is created which can be activated accordingly.

The invention and further advantageous configurations of the invention are explained in more detail with reference to schematically illustrated exemplary embodiments, in which.

It should be noted that terms such as "axially", "radially", "tangentially" etc. refer to the axis 10 used in the respective figure or in the respectively described example. In other words, the directions axially, radially, tangentially always refer to an axis 10 of the rotor and therefore to the corresponding axis of symmetry of the stator 2. In this case, "axially" describes a direction parallel to the axis 10, "radially" describes a direction orthogonal to the axis 10, towards said axis or away from said axis, and "tangentially" is a direction which is directed at a constant radial spacing from the axis and, with a constant axial position, is directed circularly around the axis 10. The expression "in the circumferential direction" can be equated with "tangentially".

With respect to a surface, for example a cross-sectional surface, the terms "axially", "radially", "tangentially" etc. describe the orientation of the normal vector of the surface, i.e. the vector which is perpendicular to the surface in question.

The expression "coaxial components", for example coaxial components such as a rotor and stator 2, is understood here to mean components which have identical normal vectors and for which the planes defined by the coaxial components are therefore parallel to one another. Furthermore, the expression is intended to include the fact that center points of coaxial components lie on the same axis of rotation or axis of symmetry. However, these center points may possibly lie at different axial positions on this axis and the said planes may therefore have a spacing >0 from one another. The expression does not necessarily demand that coaxial components have the same radius.

In association with two components which are "complementary" to one another, the term "complementary" means that their outer forms are configured in such a way that one component may preferably be arranged completely in the component which is complementary to it so that the inner surface of one component and the outer surface of the other component are ideally touching without a gap or in a flush manner. Consequently, in the case of two mutually complementary objects, the outer form of one object is therefore determined by the outer form of the other object. The term "complementary" might also be replaced by the term "inverse".

For the sake of clarity, in some cases in which components are present multiple times, it is often the case that not all illustrated components in the figures will be denoted by reference signs.

The described embodiments may be combined in any desired manner. Likewise, individual features of the respective embodiments can be combined without departing from the essence of the invention.

Figure 1:
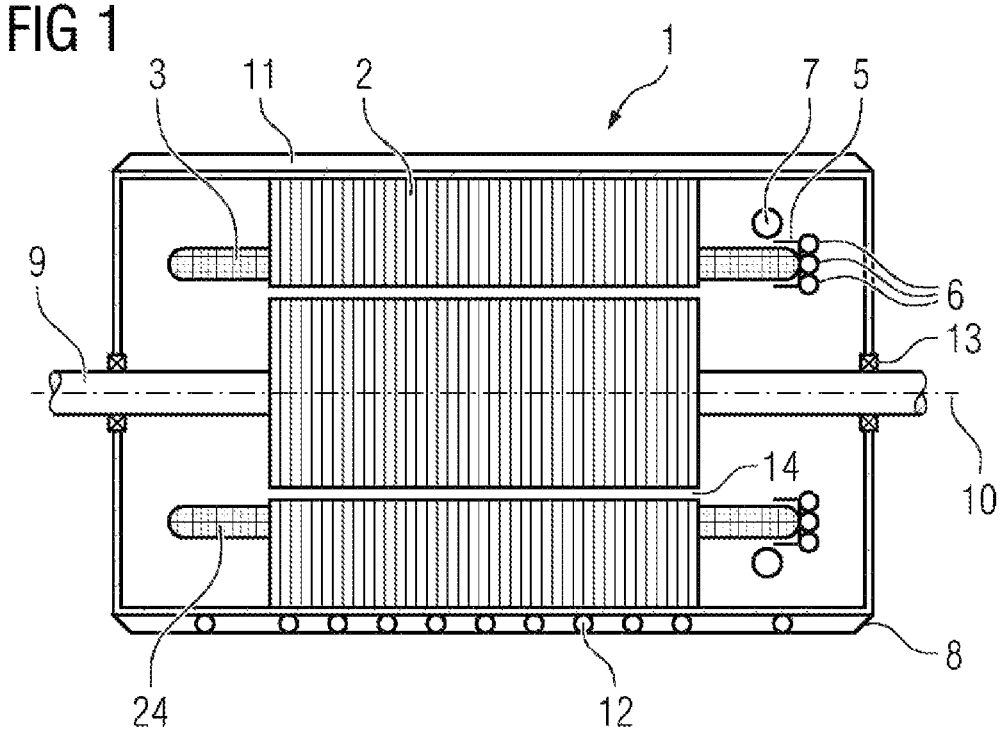
FIG. 1 shows a dynamo-electric machine.

FIG. 1 shows a longitudinal section of a dynamo-electric machine 1, which is positioned in a housing 8. A stator 2, which has a winding system 3 in slots (not illustrated in more detail) has an end winding at each of its end faces. The stator 2 is thermally joined to the housing 8, wherein the housing 8 has cooling ribs 11, as illustrated in the upper part of the longitudinal section, or alternatively, as illustrated in the lower part of the longitudinal section, a helical liquid cooling system 12, whereof the helix level is configured according to the applied thermal load. In other words: the helix level is lower in the region of the end winding 24 than in the region of the laminated core.

A rotor, which is connected to a shaft 9 in a rotationally fixed manner and is mounted to be rotatable about an axis 10, is spaced from the stator 2 by an air gap 14. The bearings 13 are arranged in end shields, which are secured in the housing 8. Bearings 13 do not necessarily have to be provided on both sides—the rotor may also be mounted in an overhung manner.

Figure 2:
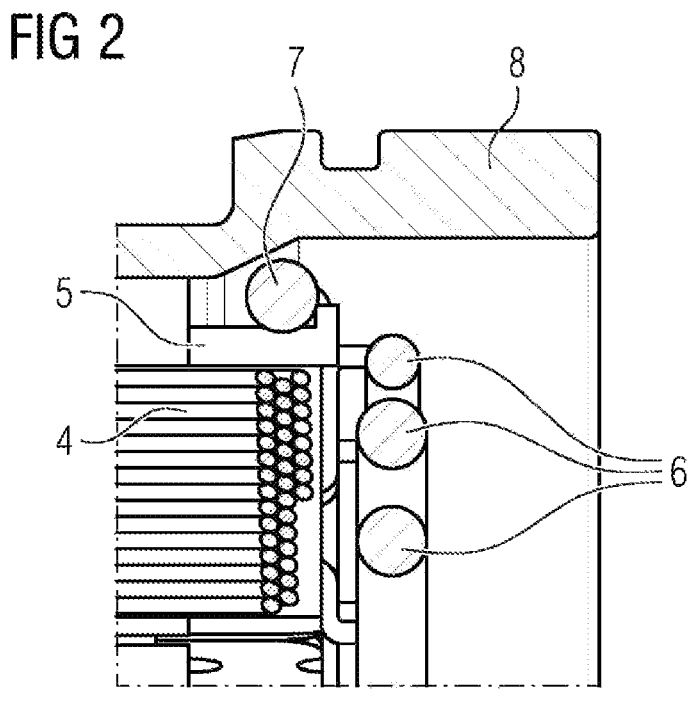
FIG. 2 shows a detailed view of an end winding in longitudinal section.

FIG. 2 shows the region of the end winding 24 in a detailed view of the longitudinal section. It can be seen here that the phase wires 6 are arranged axially at the end face of the end winding 24 in that they extend radially above one another. The electrical energy is conducted to the polyphase winding system 3 through the phase wires 6, in this case three phases. In the present case, this winding system 3 is a tooth-wound coil 4 of one phase so that, to establish an insulation capability between the phase wires 6, a winding cap 5 is provided on the end winding 24, which winding cap, on the one hand, insulates the phase wire 6 with respect to the tooth-wound coil 4 of a different phase and also serves for the guidance of the star point 7. The star-point conductor 7 is positioned radially above the end winding 24 on the winding cap 5—between the end winding 24 and the housing 8—and is therefore insulated with respect to the phase conductors 6 and the coil conductors of the tooth-wound coil 4.

The star-point conductor 7 may also be circumferentially guided here. However, it may also be divided into multiple separate circumferentially arranged star-point conductor portions, which unite mutually adjacent coil outputs of different phases in each case.

The winding cap 5 is a plastic part which, as described below, has means for securing the phase wires 6 or the star-point conductor 7.

Figure 3:
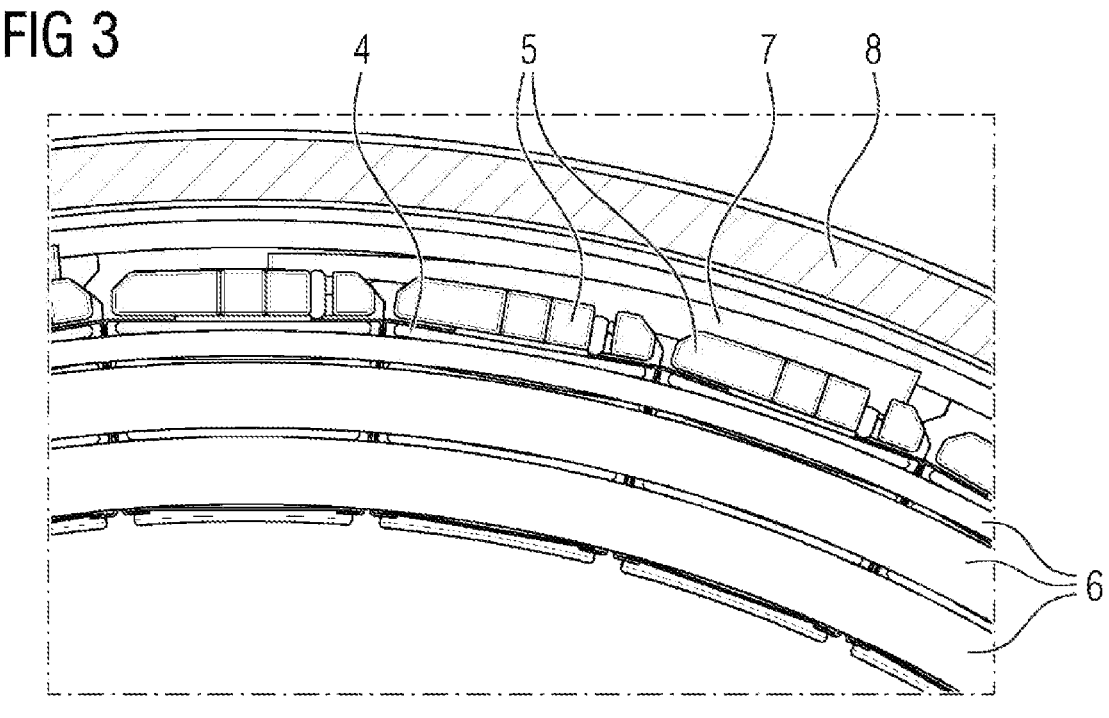
FIG. 3 shows a detailed view of an end winding in cross section.

FIG. 3 shows, in a partial cross section, the arrangement of the tooth-wound coils 4 and the path of the phase wires 6, as well as the arrangement of the star-point conductor 7. As seen in the circumferential direction, these conductors are guided along the end winding 24, at least in part.

In this embodiment, therefore, the three adjacent coil outputs are connected to one another.

What is special about this is the positioning of this connection. This is arranged in a space-saving manner radially behind or above the coils, more precisely between the coils 4 and the housing 8. The advantage of this is that the star-point connection therefore does not contribute to the axial length of the stator 2 and this stator may therefore be designed to be comparatively short in the axial direction. A further advantage is the spatial distance of the star point 7 and phase conductors 6. The greater the spacing between the star point 7 and the phase input, the better the insulation properties.

This results in a comparatively compact design of a dynamo-electric machine 1, and an improved electric strength due to the spatial separation of the phase-element connection—which also takes place at the end winding 24—and the phase inputs.

Figure 4:
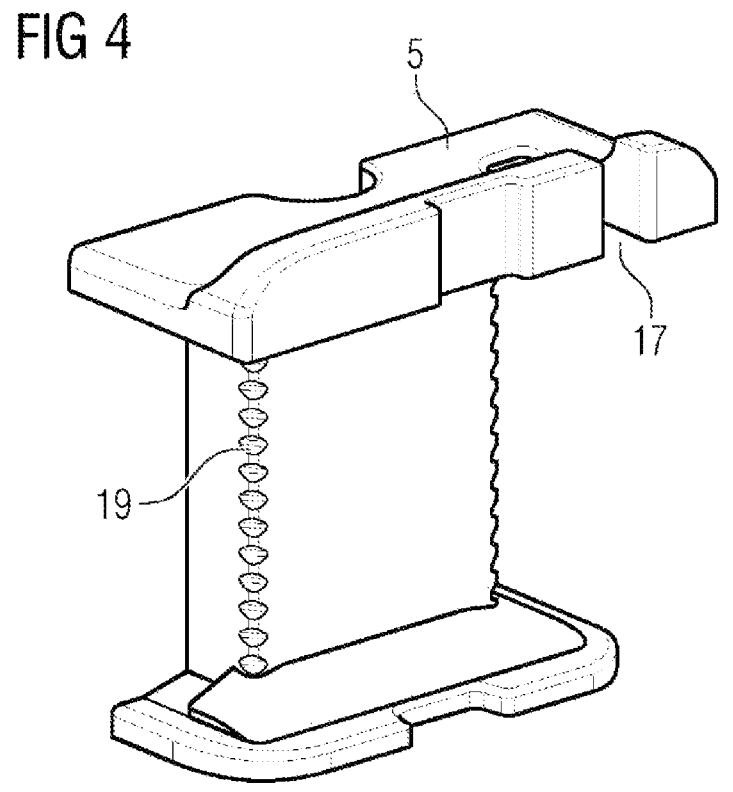
FIG. 4 shows a winding cap in a perspective illustration.

FIG. 4 shows, in a perspective illustration, a winding cap 5 with its recesses 18, ribbing 19 and openings 17, which are suitable for securing, holding and guiding the coil conductors or star-point conductor 7 or securing elements, for example cable ties. A winding cap comprises a connecting segment with ribbing 19 that extends from a first flange to a second flange. The first flange comprises a first panel disposed perpendicular to the connecting segment and a second panel that extends from the first panel in a direction that extends away from the second flange. An opening 17 is disposed in the first panel and the second panel. A recess 18 of the first panel is disposed in the second panel but not the first panel.

Figure 5:
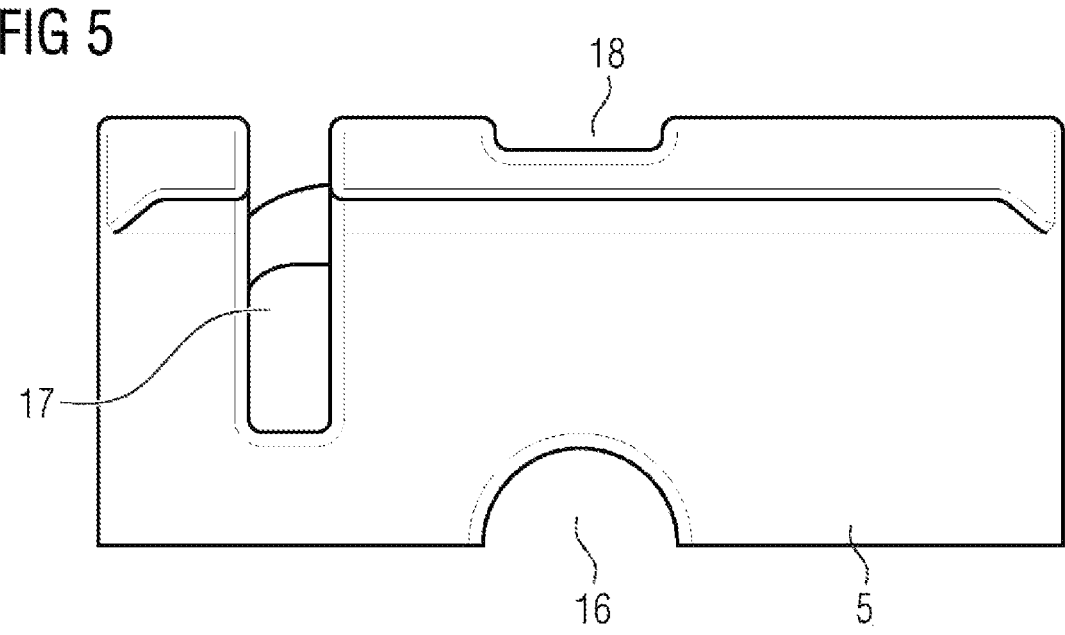
FIG. 5 shows a plan view of the winding cap.

FIG. 5 shows this cutout 16, which is particularly suitable for guiding through a band or cable tie and, together with the recesses 18, can secure the star-point conductor 7 on the end winding 24 or on the winding cap 5. The cutout 16 is disposed in the first panel but not the second panel.

Likewise, the phase conductors 6 may be fastened to the end winding 24 or to the winding cap 5 by means of a separate band or cable tie.

Alternatively, the star-point conductor(s) and the phase conductors 6 may also be fastened to the end winding 24 or to the winding cap 5 by means of a common band or cable tie.

The opening 17 enables a simple and short low-inductance connection of a coil output to the star-point conductor 7, which extends radially above the end winding 24.

Figure 6:
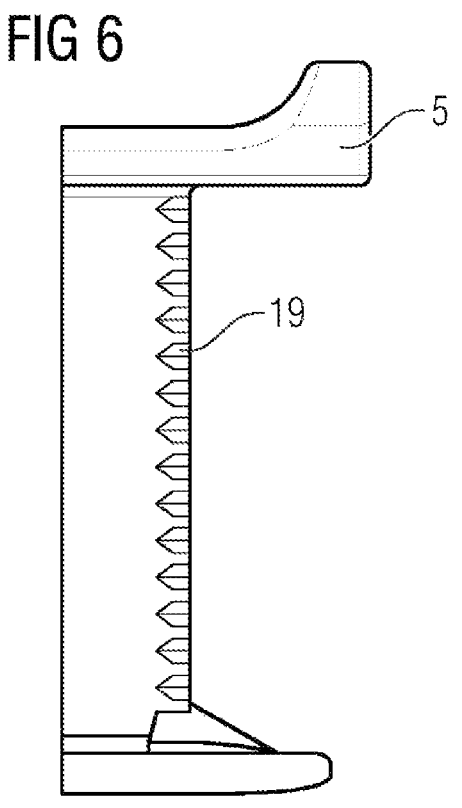
FIG. 6 shows a side view of the winding cap.

FIG. 6 shows, in a side view, the winding cap 5 with a ribbing 19 which is particularly suitable, amongst other things, for securing the position the individual coil conductors. This increases the compactness of the coil conductors and therefore results in a greater slot fill factor of the conductors in the slots of the stator 2.

Figure 7:
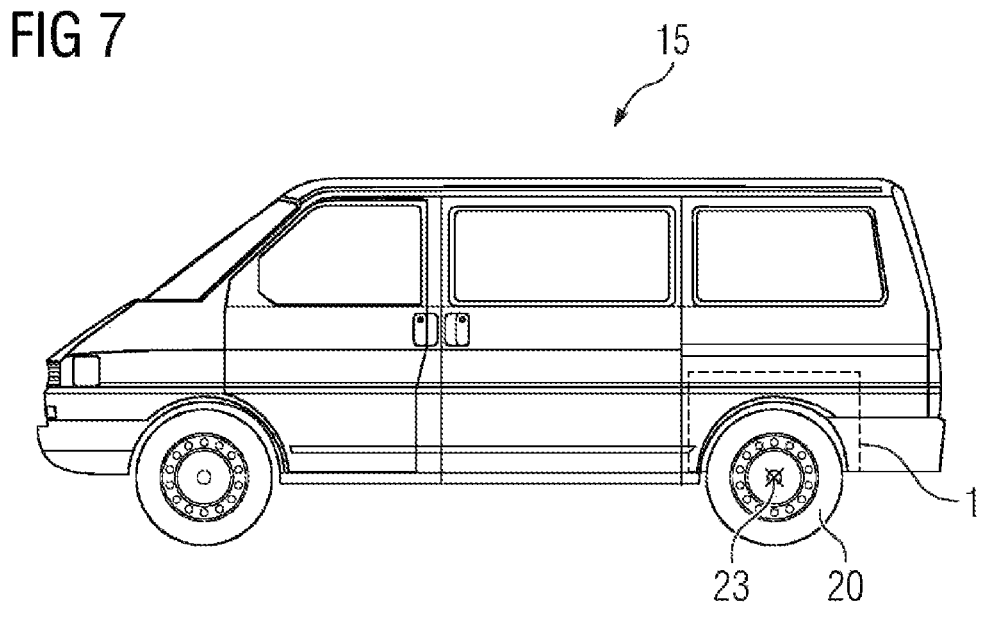
FIG. 7 shows a schematically illustrated electrically driven bus.

FIG. 7 shows, in a schematic illustration, the arrangement of such a dynamo-electric machine 1 as a drive of an electrically driven bus 15. An axle 23 is primarily driven here and the motor or the dynamo-electric machine 1 is provided axially between the wheels 20 of this bus 15.

Figure 8:
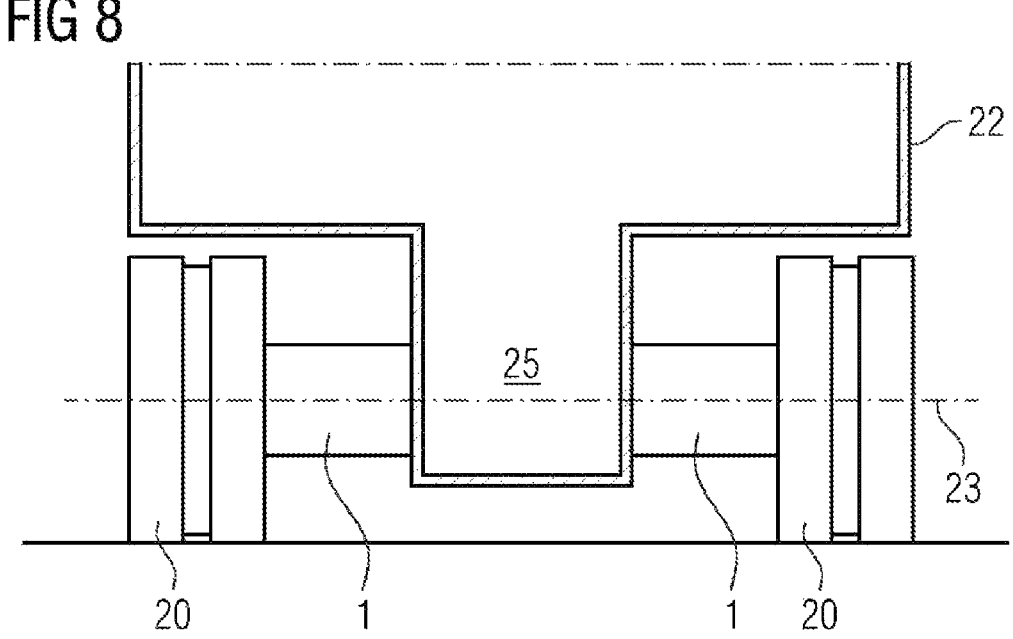
FIG. 8 shows a cross section through the drive axle of the bus.

FIG. 8 shows, in a cross section through this drive axle 23, the spatial arrangement of two motors 1 which form an electric axle when electrically coupled. By way of example, each of the motors here drives twin tires, each with two wheels 20. This may take place directly or via a gear system connected downstream. It is crucial that a passage 25 between the wheels 20 is ensured, in particular in the case of buses 15. If the motor axle 10 is axially flush with the drive axle 23, this may be advantageous for the compactness, but it is not essential so long as the passage 25 is ensured.

To maintain the insulation strength between the star point 7 or phase-element connection of the coils of one phase and the phase conductors 6, the phase conductors 6 may also be arranged radially on the end winding 24 and the star point 7 or phase-element connection of the coils may be arranged in the axial elongation of the end winding 24.

The invention claimed is:

1. A dynamo-electric machine comprising:
   a housing;
   a stator located in the housing, the stator comprising a winding system arranged in slots located in a region of an air gap, wherein the winding system is of polyphase design and forms end windings at end faces of the stator;
   wherein conductors of electrical phases are arranged axially directly on the end windings;
   wherein a conductor of a star-point of the winding system is provided radially above the end windings between the end windings and the housing;
   wherein the winding system is composed of tooth-wound coils or chorded coils and the end windings are each provided with a winding cap, wherein the winding cap guides electrical conductors of the winding system and/or phase wires and/or star-point wires and the winding cap comprises an opening that guides a coil output to the conductor of the star-point that runs radially above the end winding;

wherein each winding cap comprises a first flange and wherein the opening is in the first flange;

wherein the opening is an open-sided slot that extends from a first side of the first flange that faces toward the conductors of the electrical phases;

wherein the first flange comprises a recess that is spaced apart from the opening and extends from the first side of the first flange;

wherein each winding cap comprises a second flange opposite the first flange, and wherein the second flange comprises a second recess that is aligned with the recess of the first flange;

wherein the opening extends farther from the first side than the recess extends from the first side, the first flange comprises a cutout disposed opposite the recess, and each winding cap is disposed farther from the housing than the conductor of the star-point of the winding system is disposed from the housing; and wherein each winding cap comprises a connecting segment that extends from the first flange to the second flange, and the first flange comprises a first panel disposed perpendicular to the connecting segment and a second panel that extends from the first panel in a direction that extends away from the second flange, wherein the opening is disposed in the first panel and the second panel, the recess of the first panel is disposed in the second panel but not the first panel, and the cutout is disposed in the first panel but not the second panel.

2. The dynamo-electric machine of claim 1 wherein the housing is designed as a cooling jacket.

3. The dynamo-electric machine as claimed in claim 1 wherein the housing has a cooling system.

4. The dynamo-electric machine as claimed in claim 3 wherein the housing has axially extending ribs.

5. The dynamo-electric machine as claimed in claim 1 wherein each winding cap is disposed farther from the housing than the conductor of the star-point of the winding system is disposed from the housing.

6. The dynamo-electric machine as claimed in claim 1 wherein the tooth-wound coils or chorded coils of the winding system extend from the first flange to the second flange.

7. The dynamo-electric machine as claimed in claim 6 wherein the winding cap comprises ribbing arranged between the first flange and the second flange.

8. The dynamo-electric machine as claimed in claim 7 wherein the ribbing extends from the first flange to the second flange.

9. The dynamo-electric machine as claimed in claim 1 wherein the opening extends farther from the first side than the recess extends from the first side.

10. The dynamo-electric machine as claimed in claim 1 wherein the cutout is positioned opposite the recess of the first flange.

* * * * *